United States Patent [19]

Joyner et al.

[11] Patent Number: 5,424,911
[45] Date of Patent: Jun. 13, 1995

[54] COMPACT MOTOR CONTROLLER ASSEMBLY

[75] Inventors: Robert D. Joyner, Haw River; Jerrold J. Harrison, Gibsonville, both of N.C.

[73] Assignee: General Electric Company, New York, N.Y.

[21] Appl. No.: 295,138

[22] Filed: Aug. 24, 1994

[51] Int. Cl.[6] .............................................. H02B 5/00
[52] U.S. Cl. .................................. 361/616; 200/50 A
[58] Field of Search ............. 200/50 R, 50 A, 50 AA; 361/607, 609, 615–616

[56] References Cited

U.S. PATENT DOCUMENTS

| | | |
|---|---|---|
| 3,198,910 | 8/1965 | Burch . |
| 3,229,056 | 1/1966 | Turnbull ........................ 200/50 A |
| 3,621,339 | 11/1971 | Hodgson . |
| 3,896,353 | 7/1975 | Burton et al. ..................... 361/609 |
| 4,073,000 | 2/1978 | Krejsa ............................. 361/616 |
| 4,118,607 | 10/1978 | Shaffer ........................... 200/50 A |
| 4,760,220 | 7/1988 | Fritsch . |
| 5,057,962 | 10/1991 | Alley . |

*Primary Examiner*—Gregory D. Thompson
*Attorney, Agent, or Firm*—Richard A. Menelly

[57] ABSTRACT

High voltage motor contactors and associated equipment are arranged within upper and lower compartments that are interlocked with the external operator handle to prevent access when the contactors are electrically energized. Low voltage devices used in association with the contactors to provide total motor control function are housed within upper and lower cabinets arranged on the upper and lower compartment doors. An interlock defeat assembly is mounted within the low voltage cabinets to allow emergency access to the compartments while the contactors are still energized.

10 Claims, 3 Drawing Sheets

COMPACT MOTOR CONTROLLER ASSEMBLY

BACKGROUND OF THE INVENTION

Motor controller equipment generally includes so-called "high voltage" motor contactors such as described within U.S. Pat. No. 3,198,910 entitled "Electromagnetic Relay Having Removable Contact and Coil Assemblies" as well as "low voltage" equipment in the form of relays and the like. One such relay being that described within U.S. Pat. No. 5,057,962 entitled "Microprocessor Based Protective Relay System".

The motor controller equipment is interlocked with the externally accessible handle operator to prevent access to the high voltage equipment when the operating handle is in the ON position. U.S. Pat. No. 4,760,220 entitled "Operator Mechanism Having Reduced Handle Throw and Improved Handle Lock" is one example of such an interlock.

The state of the art of such motor controller equipment is to mount the low voltage equipment in cabinets having a separate access door from that of the high voltage contactor within a separate compartment to allow ready access to the low voltage equipment without having to turn off the contactor. U.S. Pat. No. 3,621,339 entitled "Modular High Voltage Electrical Components Cooperating Within Cabinet Housing to Provide Electrical Insulation and Cooling Air Passage" describes the separate arrangement of the high voltage contactors and low voltage equipment.

It has been determined that emergency access to the high voltage contactors may be required while such contactors are in the ON condition and that the handle interlock arrangement should be defeated without damaging the equipment enclosure.

Accordingly, one purpose of the invention is to provide means for a skilled operator to access the high voltage contactor compartment under emergency conditions while the contactor is energized.

SUMMARY OF THE INVENTION

The invention comprises accessible low voltage and inaccessible interlocked high voltage motor controller equipment within a common enclosure. An interlock defeat assembly is mounted within the low voltage equipment part of the enclosure to allow emergency access to the high voltage equipment while the equipment is still energized.

DESCRIPTION OF THE PREFERRED EMBODIMENT

Figure 1:
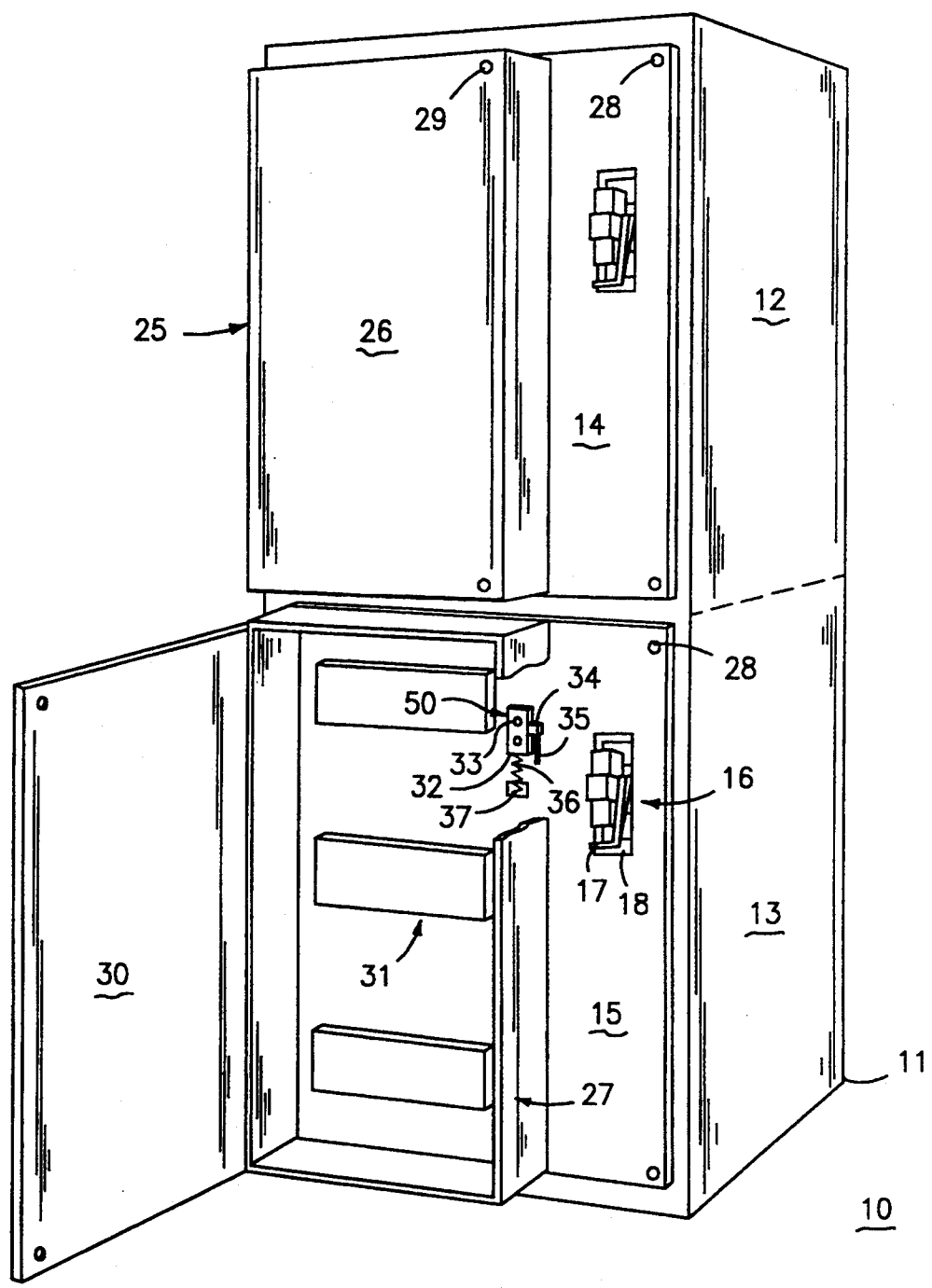
FIG. 1 is a front perspective view of a motor controller equipment enclosure containing the interlock defeat mechanism according to the invention.

The emergency accessible motor control center of the invention is depicted at 10 in FIG. 1 and includes a sheet metal enclosure 11 having top and bottom high voltage contactor compartments 12, 13. "High voltage" for purposes of this disclosure is voltage in excess of one thousand volts. The compartments are accessed by means of the top and bottom compartment doors 14, 15 respectively and the handle assembly 16 provides control of the equipment contained therein by means of the externally-accessible handle operator 17. The top and bottom low voltage cabinets 25, 27, contain the low voltage components 31 which may consist of relays, switches, alarms and the like. The low voltage cabinets are covered by doors 26, 30 which are fastened to the enclosure 11 by means of bolts 29. The bottom low voltage cabinet 27 is depicted with the door 30 open to show the high voltage interlock defeat assembly 50 in the form of a slidably mounted release plate 32 that carries the interlock defeat lever 34 projecting through the slot 35, as indicated. The return spring 36 connects with the release plate at one end and with the interior of the cabinet at the other end as indicated at 37. To access the interior of the associated bottom high voltage compartment 13 by means of the door 15 with the handle operator 17 in the ON position, and with the associated high voltage equipment electrically energized, the bolts 28 on the high voltage door 15 are removed, the low voltage cabinet door 30 is opened by removing the bolts 29, and the interior of the cabinet is exposed to provide access to the interlock defeat assembly 50. The bolts 33 holding the release plate 32 are then removed allowing the release plate to be moved upwards, as viewed in FIG. 1, against the urgence of the return spring 36.

Figure 2:
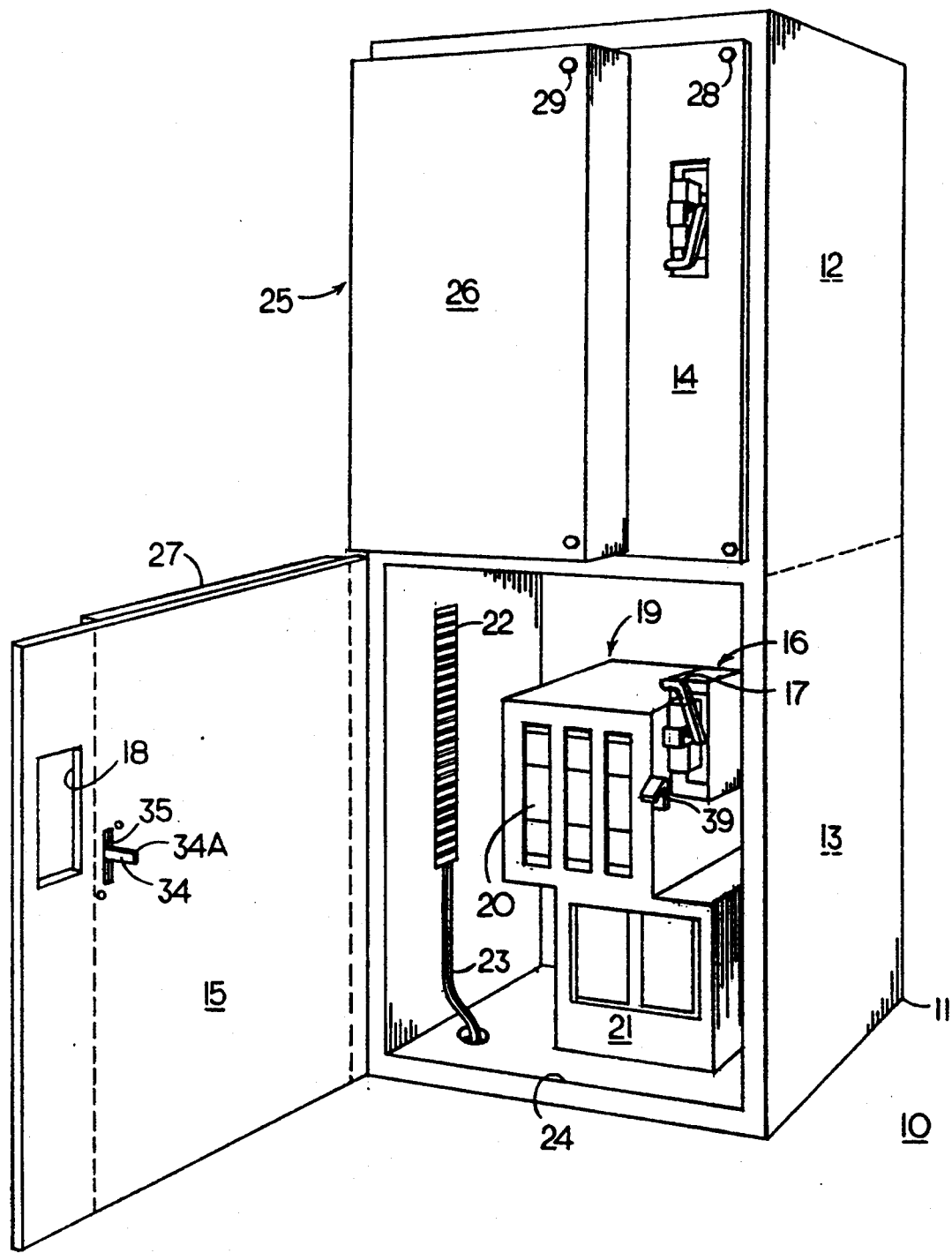
FIG. 2 is a front perspective view of the motor controller equipment enclosure of FIG. 1 with the high voltage compartment door in the open position while the equipment is energized.
Figure 3:
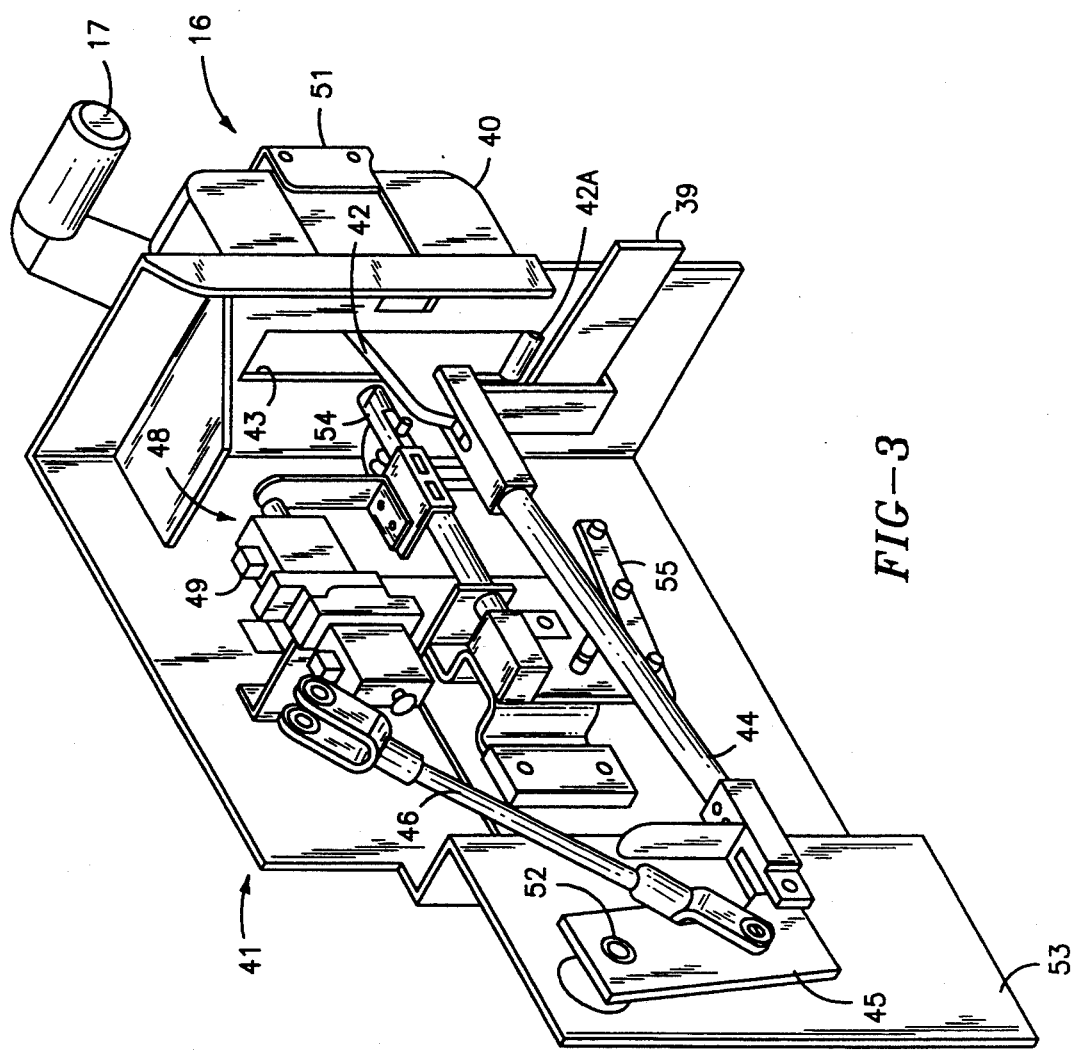
FIG. 3 is an enlarged top perspective view of the operator handle assembly contained within the equipment enclosure of FIGS. 1 and 2.

The release plate 33 carries the defeat lever 34, which extends through the slot 35, away from the interlock lever 39 as best seen by now referring jointly to the control center 10 shown in FIGS. 1 and 2 as well as to the handle assembly 16 shown in FIG. 3. With the bottom high voltage door 15 in the closed position against the enclosure 11, as shown earlier, the end 34A of the defeat lever 34 interferes with the interlock lever 39 to prevent the door 15 from swinging away from the enclosure 11 while the handle operator 17 is in the upwards ON position. This is caused by the contact between the tab 42A extending downward from the handle plate 42 and the interlock lever 39. When the handle operator is moved downward to the OFF position, the lever 39 is spring-loaded upwards away from the end 34A of the defeat lever 34 (FIG. 2) to allow the door to rotate to the open position. With the bolts 33 removed from the release plate 34 to access the interior of the compartment 13, as described earlier, an operator can then move the release plate upwards while at the same time pulling on the compartment door 15 to swing the compartment door to the open position.

The operating handle assembly 16 is shown in FIG. 3 positioned on an angular support frame 41. The assembly includes a plastic guide assembly 40 that is attached to the housing by means of a metallic bracket 51 and is arranged such that when the bracket is attached to the interior of the bottom high voltage compartment 13 of FIG. 2 the handle operator 17 extends through the handle slot 18 formed within the compartment door 15. The handle plate 42 pivotally attached to the bottom of the handle operator, extends through a slot 43 formed in the support frame and connects with a horizontal lever 44 which, in turn attaches to one end of a bell crank lever 45 which is pivotally attached to the off-set end 53 of the support frame 41. A vertical lever 46 attaches to the disconnect switch (not shown) that provides electric power to the motor contactor unit 21 of FIG. 2. Also shown in FIG. 2 are the terminals 22 that connect the interior components with external equipment such as motors and the like by means of the multiconductor cable 23 that exits the bottom 24 of the compartment 13. Referring back to FIG. 3, a plurality of modular switches 48 with actuating buttons 49 are positioned on the support frame 41 and connect with remote accessories such as indicating lamps, bell alarms and the like (not shown) depending upon user requirements. An interlock rod 54 and interlock assembly 55 interact with the horizontal rod 44 to prevent movement of the handle operator 17 when the compartment door 15 of FIG. 1 is opened in accordance with the teachings of the prior art. The advantage of the handle assembly 16 over the prior art is the modularity of the handle operating components on the common support frame 41 which closely controls the tolerances of the individual components and allows the handle assembly to be adjusted prior to attachment within the associated high voltage compartment.

In accordance with the invention, an arrangement has herein been described whereby the low voltage components of a motor controller unit are contained in a separate cabinet for easy access apart from the high voltage components. An interlock defeat mechanism is arranged whereby a skilled operator can access the high voltage compartment for observation and repair without having to turn off the high voltage components. The handle assembly is described in modular format for off-line assembly and testing as well as to control the tolerance of the handle operator components.

We claim:

1. A motor controller unit comprising:
   an enclosure 10;
   a compartment 13 within said enclosure, said compartment containing a motor contactor unit 21;
   an operating handle 16 controlling ON and OFF states of said contactor, said operating handle including a handle operator 17 extending outside said compartment providing external access thereto;
   a compartment door 15 on said compartment for deterring access to said contactor unit;
   a cabinet 27 arranged on an outer surface of said compartment door, said cabinet containing equipment 31 electrically connecting with said contactor;
   a cabinet door 30 on said cabinet for deterring access to said equipment;
   an interlock lever 39 interacting with said handle and said compartment door for preventing movement of said door to an open position when said handle operator is in an ON position; and
   an interlock defeat mechanism 50 accessible from within said cabinet for unlatching said interlock lever and allowing movement of said compartment door to said open position.

2. The motor controller unit of claim 1 including a handle plate 42 contacting said interlock lever 39 to thereby prevent said compartment door from opening when said handle operator is in said ON position.

3. The motor controller unit of claim 1 wherein said defeat mechanism comprises a plate 32 slidably mounted within said cabinet on a front surface of said compartment door.

4. The motor controller unit of claim 3 including a defeat lever 34 on said plate extending through said compartment door.

5. The motor controller unit of claim 4 wherein said defeat lever interferes with said interlock lever to prevent opening said compartment door when said handle operator is in said ON position.

6. The motor controller unit of claim 5 wherein said defeat lever is biased against said interlock lever by means of a spring 36.

7. The motor controller unit of claim 6 including plate fastening means 33 holding said plate against said front surface of said compartment door.

8. The motor controller unit of claim 1 wherein said cabinet door is prevented from rotating away from said cabinet by cabinet door fastening means 29.

9. The motor controller unit of claim 1 wherein said compartment door is prevented from rotating away from said compartment by compartment door fastening means 28.

10. A method of controlling access to components contained within a motor controller unit comprising the steps of:
   providing a compartment containing a motor contactor; arranging a compartment door on said compartment preventing access to said contactor; arranging a cabinet containing electrical components on an outer surface of said compartment door; arranging a cabinet door on said cabinet preventing access to said components; providing an interlock lever on said compartment door to prevent access to said contactor when said motor contactor is energized; and arranging interlock lever defeating means within said cabinet to allow access to said energized contactor by a skilled operator.

* * * * *